A. J. EDWARDS.
TROLLEY HARP.
APPLICATION FILED JULY 12, 1917.
1,299,152.
Patented Apr. 1, 1919.
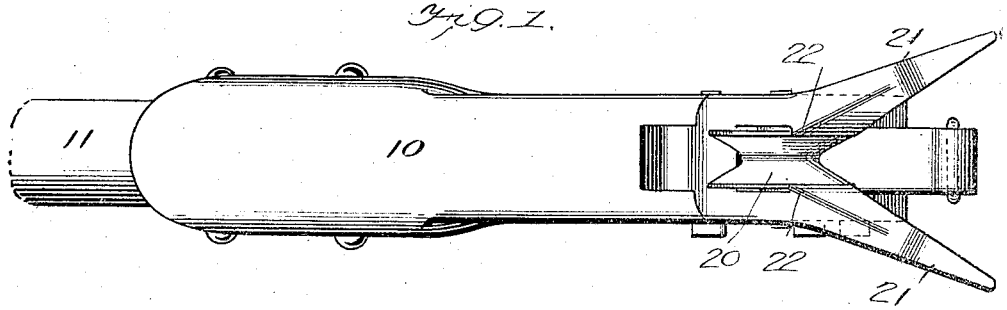
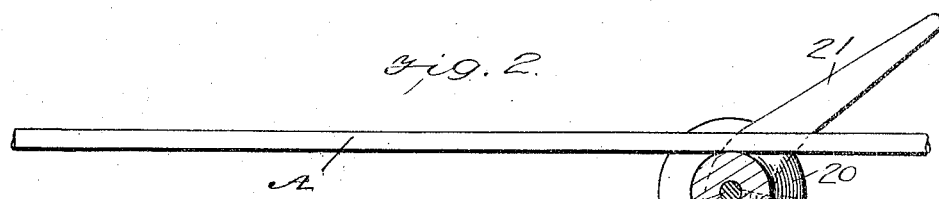
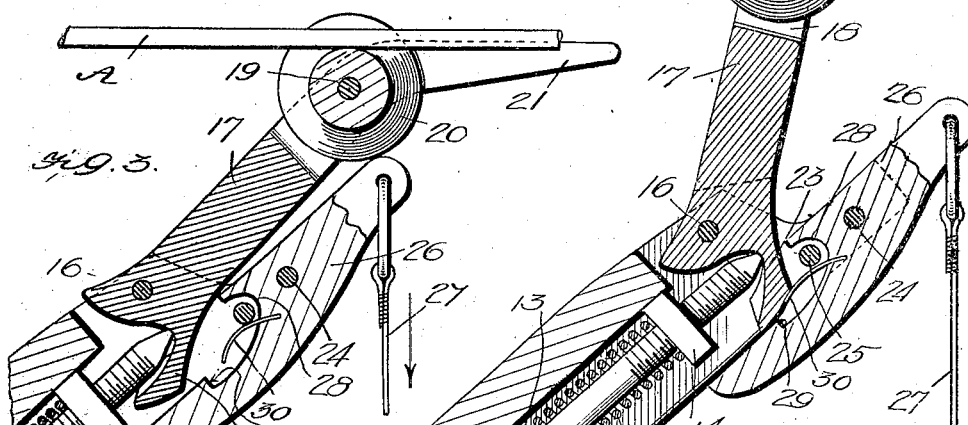
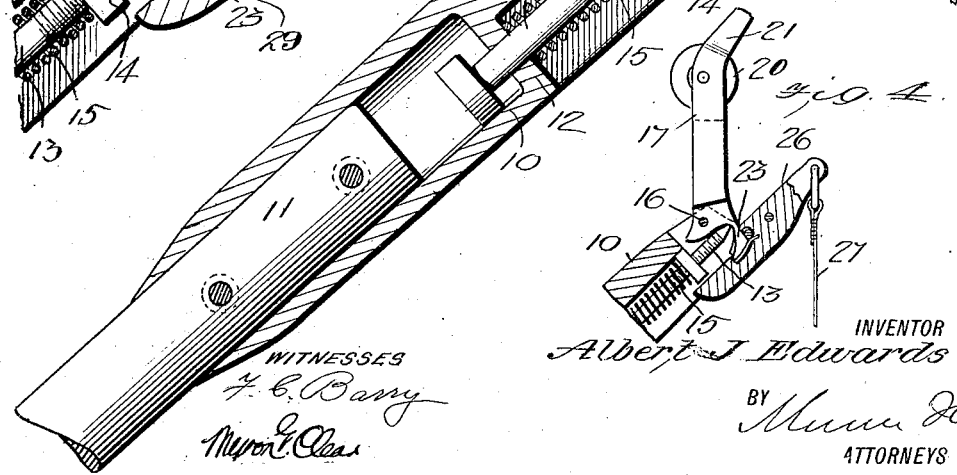
INVENTOR
Albert J. Edwards
BY
ATTORNEYS
WITNESSES

UNITED STATES PATENT OFFICE.

ALBERT JACKSON EDWARDS, OF WASHINGTON, DISTRICT OF COLUMBIA, ASSIGNOR OF ONE-HALF TO INES W. JENNINGS, OF CRAWFORD, GEORGIA.

TROLLEY-HARP.

1,299,152.        Specification of Letters Patent.        Patented Apr. 1, 1919.

Application filed July 12, 1917. Serial No. 180,108.

*To all whom it may concern:*

Be it known that I, ALBERT J. EDWARDS, a citizen of the United States, and a resident of the city of Washington, in the District of Columbia, have invented a certain new and useful Improvement in Trolley-Harps, of which the following is a specification.

My present invention relates generally to trolley poles and harps, and particularly to the construction of the harp, the manner in which the trolley wheel is supported thereby, and certain improvements whereby the trolley wheel is normally allowed full free flexing movement with respect to the harp and resiliently maintained in connection with a trolley wire, and is locked immovably in connection with a harp when the controlling cable or wire of the trolley pole is manipulated to lower the latter, or manually shift the same in locating the trolley wire.

My invention further resides in the features of construction, arrangement, and operation to be now described with reference to the accompanying drawing forming a part of this specification, and in which:

Figure 1 is a plan view of my improvements;

Fig. 2 is an enlarged longitudinal section through the harp and adjacent parts of the invention, illustrating the wheel carrying arm in partly lowered position;

Fig. 3 is a similar view of a portion of Fig. 2 with the parts in the position they assume when the pole is in normal position for operation, and Fig. 4 is a reduced section illustrating the same parts in locked position.

Referring now to these figures, my invention contemplates the provision of a trolley harp 10 attachable in any suitable manner to the pole 11, as seen in Figs. 1 and 2, and provided with a transversely extending apertured portion 12 intermediate its ends, forming a bearing for the inner headed end of a longitudinally movable bolt 13, the latter having a nut 14 threaded upon its outer portion.

Around the bolt 13 is coiled a spring 15, compressed between the bearing portion 12 of the harp and the adjustable nut 14, which normally tends to thrust the bolt lengthwise of the harp and in an outward direction, it being noted that the outer end of the said bolt terminates adjacent the outer end of the harp and that adjustment of the nut 14 provides for adjustment of the tension of the spring 15.

Adjacent its outer extremity and at one side of its longitudinal axis, the harp 10 has a transverse pivot 16 extending through one side of the inner end of the wheel carrying arm 17, in the upper forked portion 18 of which is a shaft 19 of the trolley wheel 20.

In accordance with my invention the forked portions 18 of the wheel supporting arm 17 project upwardly to form tapering rearwardly curved guide members 21, which diverge from one another in their rearward extension, as seen particularly in Fig. 1, and which thus provide for effectively guiding the trolley wire A onto the wheel 20, it being noted that the inner portions of the guide members 21 have shouldered portions 22 overlying the adjacent portion of the periphery of the wheel 20, so as to avoid engagement of the trolley wire with the rim of the wheel as the wire is guided into the usual curved periphery of the wheel.

At its inner pivoted end the wheel carrying arm 17 has a side projection 23 engaged by the outer end of the spring actuated bolt 13, as clearly seen in Figs. 2 and 3, so as to normally shift the arm 17 forwardly and upwardly and yieldingly maintain the wheel 20 in engagement with the trolley wire independent of the spring mounting of the trolley pole 11 as usual, the relatively short arc of movement of the arm 17 permitting it to better follow slight inequalities, or frozen or other adhering matter on the trolley wire, than if the entire pole should by necessity yield thereto.

At the relatively opposite side of its longitudinal axis as compared to the pivot pin 16 adjacent its extremity, the harp 10 has parallel pivot and stop pins 24 and 25, the former of which forms the fulcrum of a latch piece 26, from the upper rear free end of which depends the usual trolley controlling cable or rope 27. This latch member 26 has an intermediate concaved portion 28 through which the stop pin 25 extends so as to limit movement of the latch member on the fulcrum 24 in both directions, the latch member having an inner engaging shoulder 29 forwardly of and below the stop pin 25 for engagement with the projection 23 of the wheel carrying arm 17, and having a leaf spring 30 normally engaging the said projection 23 to hold the lower shouldered portion of the latch member in its outer inactive position, as seen in Fig. 2.

Thus with the parts normally in the position shown in Fig. 3, the tension of the trolley pole maintains the arm 17 in the substantially parallel position with respect to the trolley pole as shown, although this arm is free to yield vertically to the position shown in Fig. 2 whenever the upper end of the pole moves downwardly under vibration of the car, it being obvious that the forks 21 come into operation the instant the arm 17 is rocked to the vertical position, or nearly so, by the action of the spring 15 which swings the arm on its pivot 16. Should the trolley wheel entirely disengage from the trolley wire however, the pole flies upward and the arm 17 is thus free to rock on its pivot 16 under tension of the spring 15, to the position shown in Fig. 4, except that the latch member will be in inactive position in which it is normally retained by virtue of the engagement of spring 30 with the end of the extension 23. If during the time the wheel is off of the wire, the pull rope 27 is grasped, downward movement thereof serves to rock the latch member 26 so as to engage its shoulder 29 with the extension 23 of arm 17, thus locking the arm 17 in its vertical position shown in Fig. 4 so as to position the forks 21 above the wheel in order that they may act as an effective guide. Thus while the wheel is being adjusted back under the wire the arm 17 is latched, but as soon as the operator releases the pull rope 27 spring 30 forces the latch member 26 to the inactive position and the erector spring of the trolley pole then forces the arm 17 to the normal position shown in Fig. 3. It is thus to be observed that the spring 15 functions only to quickly swing the arm 17 on its pivot 16 when the trolley pole vibrates downwardly with respect to the trolley wire in order that upon each downward movement of the pole the rocking of the arm 17 will bring the guide forks 21 above the level of the wire and thus prevent disengagement of the pole.

It will be noted by a comparison of Figs. 2 and 3 that the normal tension of the trolley pole in operation, forces the arm 17 rearwardly against the tension of spring 15 so that the guide forks 21 are below the upper level of the trolley wires and out of danger of contact with the trolley wire supports and the like in the normal operation of the trolley. Thus when the wheel is again placed on the trolley wire and the operator releases the connection 27, latch 26 disengages and arm 17 is freed for movement to the position of Fig. 3.

It is thus obvious that without disturbing or impairing the usual operation and advantages of the pivoted wheel carrying arm 17, my improved latch member provides for readily locking the wheel carrying arm when the harp is to be manually adjusted and to bring the guide forks into operative position when the pole is lowered.

I claim:

1. A trolley harp provided with a spring actuated wheel supporting arm pivoted thereto and having a projection, a manually controlled connection for the harp, and a latch member fulcrumed on the harp and to which said manual connection is joined, said latch member having a portion engageable with the said projection of the wheel supporting arm to lock the arm against movement when the harp is manually shifted, and a spring carried by the latch member and normally engaging the said projection to hold the latch member in inactive position.

2. A trolley harp provided with a spring actuated wheel supporting arm pivoted thereto having a projection at one side of its pivot, a latch member fulcrumed on the harp and provided with a shoulder adjacent one end for engagement with the extension of said arm when the arm is in one position and having a disengaging spring, a manual controlling connection for the harp, attached to the other end of the said latch member, and a trolley wheel carried by the said arm, said arm having forks projecting beyond the wheel and at an angle to extend upwardly when the wheel supporting arm is in latched position.

ALBERT JACKSON EDWARDS.